(12) United States Patent
Dhaler et al.

(10) Patent No.: US 6,824,848 B2
(45) Date of Patent: Nov. 30, 2004

(54) SILICONE/ADHESIVE COMPLEX WHEREOF THE INTERFACE HAS A RELEASE FORCE CAPABLE OF BEING MODULATED BY ELECTRON BEAM IRRADIATION

(75) Inventors: Didier Dhaler, Tassin (FR); André Lievre, Saint-Genis-Laval (FR); Christian Mirou, Lyons (FR); Christophe Guyot, Lyons (FR)

(73) Assignee: Rhodia Chimie, Courbevoie Cedex (FR)

(*) Notice: Subject to any disclaimer, the term of this patent is extended or adjusted under 35 U.S.C. 154(b) by 0 days.

(21) Appl. No.: 10/275,385
(22) PCT Filed: May 4, 2001
(86) PCT No.: PCT/FR01/01373
§ 371 (c)(1), (2), (4) Date: Nov. 5, 2002
(87) PCT Pub. No.: WO01/85864
PCT Pub. Date: Nov. 15, 2001

(65) Prior Publication Data
US 2003/0186013 A1 Oct. 2, 2003

(30) Foreign Application Priority Data
May 5, 2000 (FR) .............................. 00 05816

(51) Int. Cl.$^7$ ................................. C09J 7/02
(52) U.S. Cl. .................. 428/40.1; 428/40.2; 428/41.3; 428/41.4; 428/41.5; 428/446; 428/447; 428/913; 525/418; 525/451
(58) Field of Search .............................. 428/40.1, 40.2, 428/41.3, 41.4, 41.5, 446, 447, 913; 525/418, 451

(56) References Cited

U.S. PATENT DOCUMENTS

5,075,349 A 12/1991 Kenichi et al.
6,482,510 B1 * 11/2002 Rajan ......................... 428/349

FOREIGN PATENT DOCUMENTS

EP 0 601 938 6/1994
WO WO 96/05962 2/1996

* cited by examiner

Primary Examiner—Nasser Ahmad
(74) Attorney, Agent, or Firm—Burns, Doane, Swecker & Mathis, L.L.P.

(57) ABSTRACT

The invention concerns a silicone/adhesive complex comprising at least a silicone coating applied on a first support and an adhesive coating applied on a second support and whereof the release force of a silicone/adhesive interface is capable of being modulated. The invention is characterised in that its silicone coating is derived from polymerisation and/or crosslinking of polyorganosiloxane monomers, oligomers and/or polymers and said silicone coating further comprises at least an additive regulating the release force of a silicone/adhesive interface and whereof the activity is initiated and capable of being modulated by electron beam irradiation.

32 Claims, 2 Drawing Sheets

SILICONE/ADHESIVE COMPLEX WHEREOF THE INTERFACE HAS A RELEASE FORCE CAPABLE OF BEING MODULATED BY ELECTRON BEAM IRRADIATION

The present invention relates in general to complexes referred to as "self-adhesive" complexes composed especially of a nonstick silicone matrix and of an adhesive coating.

This type of complex is generally intended for use where the crosslinked or cured silicone matrix is affixed to a substrate so as to make it nonstick with respect to the adhesive. This type of complex is especially applicable in the field of adhesive protective papers, labels, decorative papers and adhesive tapes.

The silicone oils or resins that have been proposed in order to obtain this type of coating having nonstick properties derive in general from cationic and/or radical crosslinking systems. More particularly, they are monomers, oligomers and/or polymers of the polyorganosiloxane kind comprising functional and reactive radicals capable of forming intrachain and interchain bridges. These systems result, after crosslinking, in nonstick coatings which form complexes called "self-adhesive" complexes with adhesives, which are applied to their surface after siliconizing.

An essential property of these silicone/adhesive complexes is that they allow an easy release of the adhesive from the silicone coating when they are used.

Depending on the nature of the applications contemplated for this type of complex, it is desirable to be able to vary the release force needed to separate the silicone coating from the adhesive coating.

This release force may in this case be quantified. Although its values may vary significantly depending on the measurement method adopted, overall it can be characterized as follows for a low release rate, that is to say of around 30 cm/min, and using the FTM3 method:

a release force of less than 15 g/cm is regarded as low;

a release force of greater than 15 g/cm and less than 70 g/cm is regarded as moderate; and a release force of greater than 70 g/cm and preferably less than 200 g/cm is regarded as high.

It is an object of the present invention specifically to provide a silicone/adhesive complex whose release force may be adjusted as required and preferably to a value lying within the abovementioned range, namely between 15 g/cm and 200 g/cm.

Figure 1:
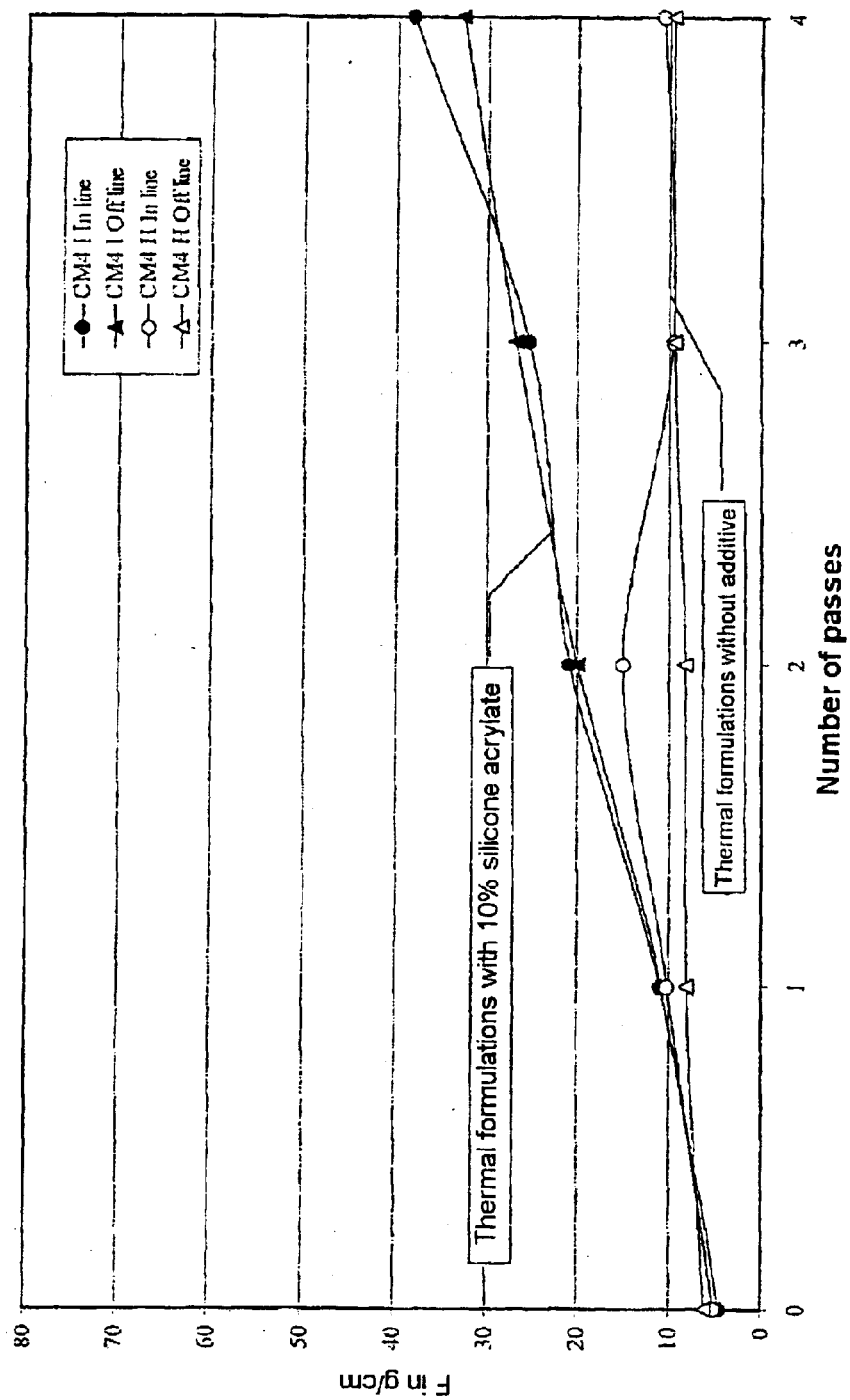
FIG. 1 shows a plot of the force v. number of passes.
Figure 2:
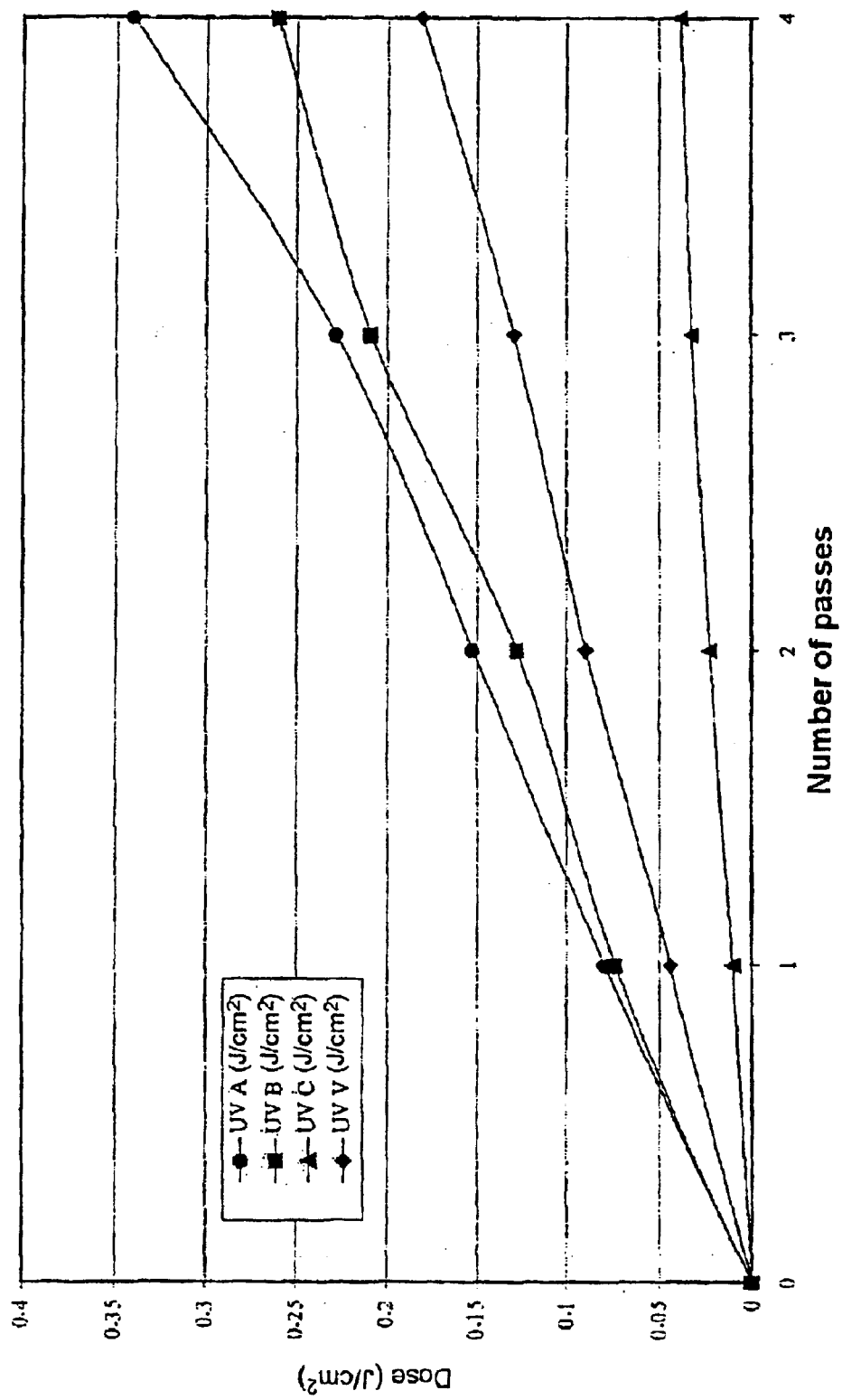
FIG. 2 shows a plot of dose v. number of passes.

More specifically, the present invention relates to the field of curable and/or crosslinkable adhesive/silicone complexes, the force to release the interface of which can be varied by means of irradiation by an electron-beam source (electron beam).

More particularly, a first subject of the present invention is a silicone/adhesive complex comprising at least one silicone coating applied to a first substrate and an adhesive coating applied to a second substrate, the force to release a silicone/adhesive interface of which can be varied, characterized in that said silicone coating comprises at least one additive for regulating the force to release a silicone/adhesive interface and the activity of which is initiated and able to be varied by electron-beam irradiation.

The additive is preferably activated by exposing, if not the complex, then at least one silicone/adhesive interface to at least one electron beam irradiation. In general, this variation is achieved by means of an electron beam source whose intensity is adjusted depending on the nature of the silicone matrix used.

According to a first variant, the two substrates consist of two separate entities placed so that the silicone coating of the first substrate is in contact with the adhesive coating of the second substrate. This embodiment is in particular illustrated by systems called self-adhesive labels. In this particular case, the force to release the silicone/adhesive interface is exerted when the two substrates are being separated.

In a second variant, the two substrates each consist respectively of the two faces of the same entity. This second embodiment is in particular illustrated by the systems called adhesive tapes. The nonstick coating, that is to say that based on the silicone matrix, and the adhesive coating are brought into contact while the substrate is being wound up on itself. In this case, the release force is exerted at the silicone/adhesive interface owing to the effect of a lower face being separated from an upper face of the material.

According to a preferred embodiment of the invention, the additive for regulating the force to release the silicone/adhesive interface adopted within the context of the present invention is chosen from:

(i) organic (meth)acrylate derivatives;

(ii) alkenyl ethers; and (iii) silicones having one or more (meth)acrylate and/or alkenyl ether functional groups.

Especially suitable organic acrylics are (meth)acrylate species and especially epoxidized (meth)acrylates; (meth)acrylo-glycero-polyesters and multifunctional (meth)acrylates; (meth)acrylo-urethanes; (meth)acrylo-polyethers; (meth)acrylo-polyesters; and (meth)acrylo-acrylics.

More particularly preferred are trimethylolpropane triacrylate, tripropylene glycol diacrylate and pentaerythritol tetraacrylate.

With regard to the alkenyl ethers, these are preferably vinyl ethers. They may be chosen from cyclohexanedimethanol divinyl ether, triethylene glycol divinyl ether (DVE-3), hydroxybutyl vinyl ether, dodecyl vinyl ether and the other vinyl ethers sold by ISP and which are in particular described in patent application WO 99/19371.

According to a preferred variant of the invention, the additive used is a silicone having one or more (meth)acrylate and/or alkenyl ether functional groups.

As representatives of (meth)acrylate functional groups carried by the silicone and most particularly suitable for the invention, mention may more particularly be made of acrylate, methacrylate, (meth)acrylate ether and (meth)acrylate ester derivatives linked to the polysiloxane chain via a Si—C bond. Such acrylate derivatives are especially described in patents EP 281 718, FR 2 632 960 and EP 940 458.

As regards the silicone derivatives having alkenyl ether functional groups, these are generally derived from a hydrosilylation reaction between oils containing SiH structural units and compounds carrying alkenyl ether functional groups such as allyl vinyl ethers, allyl vinyloxy ethoxybenzene and the like. This type of compound is e.g. referred to in U.S. Pat. No. 5,340,898.

The additive is contained in the silicone coating and is of course present in an amount sufficient to regulate the force to release the adhesive/silicone interface. It may be present in an amount up to 50% by weight of the silicone coating expressed as dry matter.

However, the additive is preferably employed in an amount of about 0.1 to 20% by weight of the total silicone mixture. Of course, the amount of this additive can vary significantly depending on whether or not it is of a silicone nature.

Thus, in the particular case in which this additive is an organic acrylate derivative or an alkenyl ether, its amount is generally between about 0.1 and 10% preferably about 0.5 and 5%, and more preferably 1 and 3%.

On the other hand, an additive of the silicone type is preferably used in an amount up to 20% by weight and preferably 15% by weight.

Moreover, it seems that the amount of EB irradiation, generally expressed as a radiation dose, is a useful parameter for varying the activity of the additive defined above and therefore adjusting the magnitude of the release force generated by this additive.

Thus, in the examples given below, it will be noted that the level of adhesion between the silicone coating and the adhesive with which it is associated is significantly increased after irradiation. Advantageously, the release force turns out to vary depending on the amount of additive present in the formation and on the intensity of irradiation.

The silicone coating generally derives from the polymerization and/or crosslinking of polyorganosiloxane monomers, oligomers and/or polymers.

Actually, this polymerization and/or crosslinking may derive:

from a hydrosilylation reaction between, on the one hand, monomers, oligomers and/or polymers carrying reactive SiH structural units and, on the other hand, monomers, oligomers and/or polymers carrying an unsaturated aliphatic reactive group;

from a dehydrogenocondensation reaction between, on the one hand, monomers, oligomers and/or polymers carrying reactive SiH structural units and, on the other hand, polymers, oligomers and/or polymers carrying SiH units and/or reactive groups;

from a reaction of crosslinking/polymerization of monomers, oligomers and/or polymers carrying reactive units of the acrylate, epoxy, oxetane, dioxolane and/or alkenyl ether reactive units, it being possible for this reaction to be carried out by UV irradiation, thermal activation or by an electron beam.

In the variant in which the coating derives from a hydrosilylation reaction, the polyorganosiloxane derivatives are preferably chosen so that the polyorganosiloxane possessing at least one SiH radical per molecule is a polyorganosiloxane A as defined below and the polyorganosiloxane possessing at least one unsaturated aliphatic reactive group per molecule satisfies the definition of the polyorganosiloxane B described below.

The compounds A are chosen from polyorganohydrogenosiloxanes comprising:

units of the following formula:

(1)

in which:

the symbols W, which are similar and/or different, represent:

a linear or branched alkyl radical containing 1 to 18 carbon atoms, optionally substituted with at least one halogen, preferably fluorine, the alkyl radicals preferably being methyl, ethyl, propyl, octyl and 3,3,3-trifluoropropyl, a cycloalkyl radical containing between 5 and 8 cyclic carbon atoms, optionally substituted with at least one halogen, preferably fluorine, an aryl radical containing between 6 and 12 carbon atoms which may optionally be substituted on the aryl part with halogens, alkyls, and/or alkoxyls containing 1 to 3 carbon atoms, preferably phenyl or dichlorophenyl, an arylalkyl part having an alkyl part containing between 5 and 14 carbon atoms and an aryl part containing between 6 and 12 carbon atoms, optionally substituted on the aryl part by halogens, alkyls and/or alkoxyls containing 1 to 3 carbon atoms, a is 1 or 2, b is 0, 1 or 2, with the sum (a+b) having a value of between 1 and 3; and optionally, other units of average formula (2):

(2)

in which W has the same meaning as above and c has a value of between 0 and 3.

The polyorganosiloxane A may be formed from units of formula (1) alone or may further include units of formula (2). It may have a linear, branched or unbranched, cyclic or network structure. The degree of polymerization is greater than or equal to 2. More generally, it is less than 5000.

Examples of units of formula (1) are:

When these are linear polymers, they essentially consist of $W_2SiO_{2/2}$ and $WHSiO_{2/2}$ "D" units and $W_3SiO_{1/2}$ and $W_2HSiO_{1/2}$ "M" units.

These linear polyorganosiloxanes may be oils having a dynamic viscosity at 25° C. of around 1 to 100,000 mPa.s at 25° C., generally around 10 to 5000 mPa.s at 25° C., or gums having a molecular mass of around 1,000,000.

When these are cyclic polyorganosiloxanes, they consist of $W_2SiO_{2/2}$ and $WHSiO_{2/2}$ "D" units, which may be of the dialkylsiloxy or alkylarylsiloxy type. They have a viscosity of around 1 to 5000 mPa.s.

The dynamic viscosity at 25° C. of all the polymers considered in the present specification may be measured using a Brookfield viscometer according to the AFNOR NFT 76 102 standard of February 1972.

Examples of polyorganosiloxanes A are: dimethyl polysiloxanes having hydrogenodimethylsilyl end groups; dimethylhydrogenomethylpolysiloxane copolymers having trimethylsilyl end groups; dimethylhydrogenomethylpolysiloxane copolymers having hydrogenodimethylsilyl end groups; hydrogenomethylpolysiloxanes having trimethylsilyl end groups; and cyclic hydrogenomethylpolysiloxanes.

With regard to the polyorganosiloxanes B, namely those having at least one unsaturated aliphatic reactive group per molecule, these are preferably selected from polyorganosiloxanes comprising:

similar or different units of formula (3):

(3)

in which:

the symbols W', which are similar and/or different, correspond to the same definition as that given above in the case of W, the symbols Y are similar or different and represent a $C_1$–$C_{12}$ linear or branched alkenyl residue having at least one ethylenically unsaturated group at the chain end and/or in the chain, and optionally at least one heteroatom;

e is equal to 1 or 2, d is equal to 0, 1 or 2 with the sum (d+e) having a value of between 1 and 3;

and, optionally, other units of average formula (2) as defined above.

The polyorganosiloxane B may be formed only from units of formula (3) alone or may further include units of formula (2).

With regard to the residues Y, these are advantageously chosen from the following list: vinyl, propenyl, 3-butenyl, 5-hexenyl, 9-decenyl, 10-undecenyl, 5,9-decadienyl and 6,11-dodecadienyl.

These polyorganosiloxanes may have a linear (branched or unbranched), cyclic or network structure. Their degree of polymerization is preferably between 2 and 5000.

When these are linear polymers, they essentially consist of $W'_2SiO_{2/2}$, $W'YSiO_{2/2}$ and $Y_2SiO_{2/2}$ "D" units, and $W'_3SiO_{1/2}$, $W'Y_2SiO_{1/2}$ and $W'_2YSiO_{1/2}$ "M" units.

As examples of terminal "M" units mention may be made of trimethylsiloxy, dimethylphenylsiloxy, dimethylvinylsiloxy, dimethylhexenylsiloxy, dimethylethoxysiloxy and dimethylethyltriethoxysiloxy groups.

As examples of "D" groups mention may be made of dimethylsiloxy, methylphenylsiloxy, methylvinylsiloxy, methylbutenylsiloxy, methylhexenylsiloxy, methyldecenylsiloxy, methyldecadienylsiloxy, methyl-3-hydropropylsiloxy, methyl-3-glycidoxypropylsiloxy, methyl-2-(3',4'-epoxycyclohexyl)ethylsiloxy, methylbutoxysiloxy, methyl-β-trimethoxysilylethylsiloxy and methyl-β-triethoxysilylethylsiloxy groups.

Said linear polyorganosiloxanes may be oils having a dynamic viscosity at 25° C. of around 1 to 100,000 mPa.s at 25° C., generally around 10 to 5000 mPa.s at 25° C., or gums having a molecular mass of around 1,000,000.

When these are cyclic polyorganosiloxanes, they consist of $W_2SiO_{2/2}$, $Y_2SiO_{2/2}$ and $WYSiO_{2/2}$ "D" units, which may be of the dialkylsiloxy, alkylarylsiloxy, alkylvinylsiloxy, alkylsiloxy or alkylXsiloxy type; examples of such units have already been mentioned above.

Said cyclic polyorganosiloxanes B have a viscosity of around 1 to 5000 mPa.s.

The compounds B having aliphatically unsaturated groups, which are useful within the context of the process according to the invention, are, for example, those having olefinically or acetylenically unsaturated groups, these being well known in the technical field in question. In this regard, reference may be made to U.S. Pat. Nos. 3,159,662, 3,220,272 and 3,410,886 which describe the abovementioned compounds.

According to an advantageous variant of the invention, the reaction mixture comprises compounds A and compounds B in an amount such that the SiH/unsaturated groups molar ratio is between 0.4 and 10, preferably between 1 and 4 and more preferably still is around 1.7. Furthermore, in practice, within the reaction mixture, at least one of the compounds A comprises at least three SiH radicals and at least one of the compounds B comprises at least two aliphatic reactive groups.

The thermally activated hydrosilylation reaction conditions are standard conditions. They are generally catalyzed by heat-sensitive platinum complexes. As representatives of these catalysts, mention may especially made of Karstedt's catalyst. The catalyst is present in an amount of 1 to 400, preferably from 10 to 300 and more preferably from 20 to 200 ppm of platinum metal expressed by weight with respect to the polyorganosiloxane compound used.

Apart from this catalyst, the components of the silicone coating contain an inhibitor for initiating the reaction. Especially suitable as inhibitors are dialkyl carboxylic esters, such as a dialkyl maleate, or hydroperoxides.

In a second variant in which the silicone coating derives from a dehydrogenocondensation reaction, the polyorganosiloxane derivatives are preferably chosen so that the polyorganosiloxane derivative possessing at least one reactive SiH radical per molecule is a polyorganosiloxane A as defined above and the polyorganosiloxane having at least one reactive SiOH radical per molecule satisfies the definition of the polyorganosiloxane C described below.

The compounds C are chosen from polyorganosiloxanes comprising:

units of the following formula (4):

in which:

the symbols W", which are similar or different, are by definition identical to W according to formula (1), f is 1 or 2, g is 0, 1 or 2, with the sum (f+g) having a value of between 1 and 3;

and, optionally, other units of formula (2) as defined above.

The polyorganosiloxane C may be formed only from units of formula (4) or may also include units of formula (2).

It may have a linear, branched or unbranched, cyclic or network structure. The degree of polymerization is greater than or equal to 2. More generally, it is less than 5000.

Examples of units of formula (4) are:

When these are linear polymers, they essentially consist of $W''_2SiO_{2/2}$, $W''(OH)SiO_{2/2}$, and $(OH)_2SiO_{2/2}$ "D" units and $W''_3SiO_{1/2}$ and $W''(OH)_2SiO_{1/2}$ "M" units.

These linear polyorganosiloxanes may be oils having a dynamic viscosity at 25° C. of around 1 to 100,000 mPa.s at 25° C., generally around 10 to 5000 mPa.s at 25° C., or gums having a molecular mass of around 1,000,000.

When these are cyclic polyorganosiloxanes, they consist of $W''_2SiO_{2/2}$, and $W''(OH)SiO_{2/2}$, $(OH)_2SiO_{2/2}$ "D" units which may be of the dialkylsiloxy or alkylarylsiloxy type. They have a viscosity of around 1 to 5000 mPa.s.

The dynamic viscosity at 25° C. of all the polymers considered in the present specification may be measured using a Brookfield viscometer according to the AFNOR NFT 76 102 standard of February 1972.

According to an advantageous variant of the invention, the polyorganosiloxanes A used comprise from 1 to 50 SiH units per molecule. According to an advantageous variant of the invention, the polyorganosiloxanes C used comprise from 1 to 50 SiOH units per molecule.

Moreover, in practice, within the reaction mixture, at least one of the compounds A comprises at least three SiH radicals and at least one of the compounds C comprises at least two SiOH groups.

The reaction conditions for dehydrogenocondensation between the polyorganosiloxane-type monomers, oligomers and/or polymers having SiH units and the polyorganosiloxane-type monomers, oligomers and/or polymers having SiOH units are standard conditions, for example by thermal-type activation in the presence of a catalyst (W. Alternoll "Chemistry and Technology of Silicones", Edition 68, chapter 5, page 201–205).

With regard to the third variant, according to which the coating derives from the polymerization and/or crosslinking by UV irradiation, thermal activation or by an electron beam of polyorganosiloxane monomers, oligomers or polymers carrying reactive units of the acrylate, epoxy, oxetane, dioxolane, and/or alkenyl ether type, the latter polyorganosiloxanes are preferably chosen from polyorganohydrogenosiloxanes comprising:

units of the following formula (5):

in which:
the symbols W''', which are similar and/or different, correspond to the same definition as given for W in formula (1);
the symbols Z are similar or different and represent:
a group W''',
a hydrogen radical, and/or
a crosslinkable organofunctional group, preferably an acrylate functional, epoxy functional, oxetane functional, dioxolane functional and/or alkenyl ether functional group, linked to the silicon of the polyorganosiloxane via a divalent radical containing from 2 to 20 carbon atoms and possibly containing at least one heteroatom, preferably oxygen,
with at least one of the symbols Z representing a crosslinkable functional organic group;
h is equal to 1 or 2, i is equal to 0, 1 or 2 with the sum (h+i) having a value of between 1 and 3;
optionally, other units of formula (2) as defined above.

According to an advantageous variant of the invention, the polyorganosiloxanes used contain from 3 to 10 organofunctional groups per macromolecular chain. For an epoxy functional group, this corresponds to epoxyde levels varying from 20 to 2000 molar meq./100 g of polyorganosiloxane.

As examples of organofunctional radicals, mention may be made of those included in the following formulae:

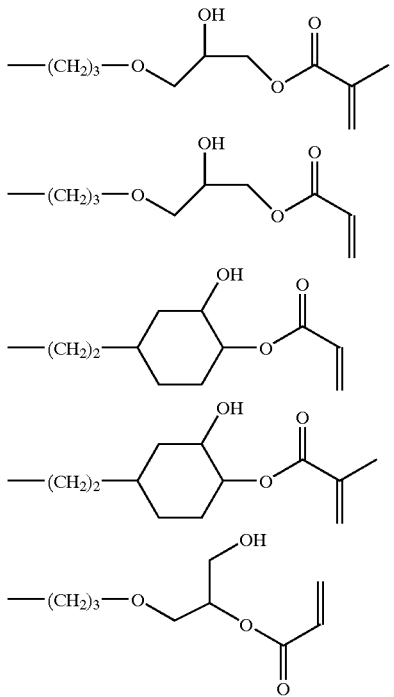

and their isomers;

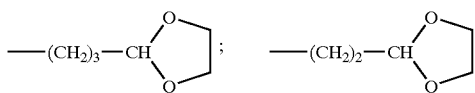

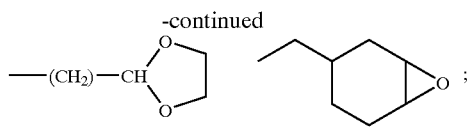

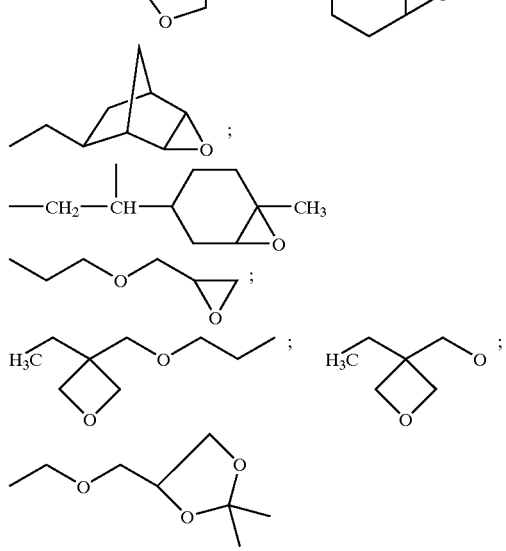

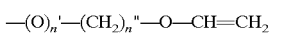
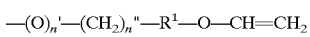
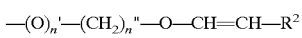

in which:
n' represents 0 or 1 and n'' an integer between 1 and 5;
$R^1$ represents:
a $C_1$–$C_{12}$ linear, branched or cyclic alkylene radical, optionally substituted, or
a $C_5$–$C_{12}$ arylene radical, preferably phenylene, optionally substituted, preferably with one to three $C_1$–$C_6$ alkyl groups;
$R^2$ represents a $C_1$–$C_6$ linear or branched alkyl radical.

The linear polyorganosiloxanes may be oils having a dynamic viscosity at 25° C. of around 10 to 10 000 mPa.s at 25° C., generally of around 20 to 5000 mPa.s at 25° C. and more preferably still 20 to 600 mPa.s at 25° C., or gums having a molecular mass of around 1,000,000.

When these are cyclic polyorganosiloxanes, they consist of units which may, for example, be of the dialkylsiloxy or alkylarylsiloxy type. These cyclic polyorganosiloxanes have a viscosity of around 1 to 5,000 mPa.s.

The dynamic viscosity at 25° C. of all the silicones considered in the present description may be measured using a Brookfield viscometer according to the AFNOR NFT 76 102 standard of February 1972.

This type of compound is described in particular in the patents DE-A 4 009 889; EP-A 396 130; EP-A 355 381; EP-A 105 341; FR-A 2 110 115 and FR-A 2 526 800.

The vinyloxy functional polyorganosiloxanes may be prepared, for example, by a hydrosilylation reaction between oils having SiH units and vinyloxy functional compounds such as allyl vinyl ether and allyl vinyloxy ethoxybenzene.

The epoxy functional polyorganosiloxanes may be prepared, for example, by a hydrosilylation reaction between oils having SiH units and epoxy functional compounds such as 4-vinylcyclohexene oxide and allyl glycidyl ether.

The oxetane functional polyorganosiloxanes may be prepared, for example, by hydrosilylation of unsaturated oxetanes or by condensation of oxetanes containing a hydroxy functional group.

The dioxolane functional polyorganosiloxanes may be prepared, for example, by hydrosilylation of unsaturated dioxolanes.

The acrylate functional polyorganosiloxane may be prepared, for example, by reacting an epoxy functionalized polyorganosiloxane with acrylic acid.

The UV, thermal or electron-beam crosslinking and/or polymerization reaction conditions are standard conditions.

As conventional initiators, those described in patent EP 562 897 are especially recommended. They may also be corresponding iodonium or sulfonium salts of hexafluorophosphate or hexafluoroantimonate.

In this case, the present invention makes it possible advantageously to dispense with conventional modulators.

As representative examples of such modulators, mention may more particularly be made of the resins comprising especially M units and Q units and/or T units. M units are as defined above, Q silicone units are of the $SiO_{4/2}$ type and T units are of the $SiO_{3/2}W$ type, with W as defined above.

These resins are in fact resins through which it is possible to vary the level of adhesion of the corresponding silicone coating to a given substrate.

Conventionally, it is through the proportion of this type of resin in a silicone composition that the degree of adhesion of the corresponding silicone coating to a substrate is adjusted.

The silicone coating according to the invention may also include additives.

These, for example, may be mineral or non-mineral fillers and/or pigments, such as synthetic or natural fibers, calcium carbonate, talc, clay, titanium dioxide or fumed silica. This may especially allow the mechanical properties of the final materials to be improved.

Soluble dyes, oxidation inhibitors and/or any other material not interfering with the catalytic activity of the platinum complex and the release-force-regulating activity of the additive may also be added to the component of the silicone coating.

With regard to the adhesive, this is chosen from the adhesives commonly used for being coated on the surface of a large variety of materials so as to obtain labels, tapes or any other pressure-sensitive self-adhering material, called PSAs (pressure-sensitive adhesives). These adhesives give the material the ability to adhere to the surface of a substrate, without requiring any activation other than slight pressure. PSA-type adhesives may be in solvent form, in aqueous form, and especially in an emulsion phase, and/or in hot-melt form.

The monomers used to prepare the adhesive are selected according to their glass transition temperature, Tg, in order to give the polymers incorporating them the expected behavior in terms of adhesion and viscoelasticity. For this purpose, the monomers advantageously possess a glass transition temperature which is low enough, generally between −70 and −10° C., and is preferably less than −30° C.

More specifically, these monomers are chosen from the group consisting of:

(meth)acrylic esters, such as esters of acrylic acid and of methacrylic acid with hydrogenated or fluorinated $C_1$-$C_{12}$, preferably $C_1$-$C_8$, alkanols, particularly methyl acrylate, ethyl acrylate, propyl acrylate, n-butyl acrylate, isobutyl acrylate, 2-ethylhexyl acrylate, tert-butyl acrylate, hexyl acrylate, heptyl acrylate, octyl acrylate, isooctyl acrylate, decyl acrylate, dodecyl acrylate, methyl methacrylate, ethyl methacrylate, n-butyl methacrylate and isobutyl methacrylate;

vinyl nitriles including more particularly those having from 3 to 12 carbon atoms, such as, in particular, acrylonitrile and methacrylonitrile;

vinyl esters of carboxylic acid, such as vinyl acetate, vinyl versatate and vinyl propionate;

ethylenically unsaturated monocarboxylic and dicarboxylic acids, such as acrylic acid, methacrylic acid, itaconic acid, maleic acid and fumaric acid, and monoalkyl and dialkyl esters of monocarboxylic and dicarboxylic acids of the type mentioned with alkanols preferably having from 1 to 8 carbon atoms and their N-substituted derivatives;

amides of unsaturated carboxylic acids, such as acrylamide, methacrylamide, N-methylolacrylamide or methacrylamide, and N-alkylacrylamides;

ethylenic monomers containing a sulfonic acid group and its ammonium or alkali metal salts, for example vinylsulfonic acid, vinylbenzenesulfonic acid, alpha-acrylamidomethylpropanesulfonic acid and 2-sulfoethylene methacrylate;

unsaturated ethylenic monomers containing a secondary, tertiary or quaternary amino group, or a heterocyclic group containing nitrogen, such as, for example, vinylpyridines, vinylimidazole, aminoalkyl (meth)acrylates and aminoalkyl (meth)acrylamides such as dimethylaminoethyl acrylate or dimethylaminoethyl methacrylate, di-tert-butylaminoethyl acrylate or di-tert-butylaminoethyl methacrylate and dimethylaminomethylacrylamide or dimethylaminomethyl-methacrylamide;

zwitterionic monomers such as, for example, sulfopropyl (dimethyl)aminopropyl acrylate;

ethylenic monomers carrying a sulfate group;

ethylenic monomers carrying one or more phosphate and/or phosphonate functional groups; and mixtures thereof.

Preferably, the PSAs are predominantly obtained by the polymerization of alkyl acrylate monomers such as alkyl (meth)acrylate monomers, which are generally present in an amount from 50 to about 99% and preferably in an amount from 80 to 99% by weight, and of copolymerizable polar monomers, such as, for example, acrylic acid, in smaller proportions.

More preferably, the monomers are chosen from 2-ethylhexyl acrylate, butyl acrylate, hexyl acrylate, heptyl acrylate, octyl acrylate, isooctyl acrylate, decyl acrylate, isobutyl acrylate, dodecyl acrylate or mixtures thereof, or methacrylates such as n-butyl methacrylate, methacrylic acid, acrylic acid, itaconic acid, maleic acid and/or acrylamide.

The PSAs may, of course, be used in a formulated form, that is to say blended with conventional additives for adhesives, such as wetting agents, tackifiers, etc.

Conventionally, the complexes according to the invention may furthermore include one or more additives chosen depending on the intended final application.

The additives may especially be compounds, optionally in the form of polymers, having mobile hydrogens, such as alcohols, glycols and polyols, useful for improving the flexibility in particular of the silicone matrix after polymerization and/or crosslinking; mention may be made, for example, of polycaprolactone-polyols, in particular the polymer obtained initially from 2-ethyl-2-(hydroxymethyl)-1,3-propanediol and from 2-oxepanone, such as the product TONE POLYOL-301 sold by Union Carbide, or the other commercial polymers TONE POLYOL 201 and TONE POLYOL 12703 from Union Carbide. Mention may also be made, as additives, of long-chain alkyl diacids, fatty esters of unsaturated acids which may or may not be epoxidized, for example epoxidized soybean oil or epoxidized linseed oil, epoxidized 2-ethylhexyl ester, 2-ethylhexyl epoxystearate, octyl epoxystearate, epoxidized acrylic esters, epoxidized soybean oil acrylates, epoxidized linseed oil acrylates, diglycidyl ether of polypropylene glycol, long-chain aliphatic epoxides, etc.

Irrespective of the nature of the polymerizable matrix, they may also be, for example: fillers such as, in particular, ground natural or synthetic (polymeric) fibers, calcium carbonate, talc, clay, titanium dioxide, precipitated silica or pyrogenic silica; soluble dyes; oxidation and corrosion inhibitors; organosilicic or nonorganosilicic adhesion promoters; fungicides, bactericides, antimicrobial agents; and/or any other material not interfering with the activity of the additive according to the invention.

The amounts of coating deposited on the substrates can vary.

The amounts of silicone coating usually range from 0.1 to 5 $g/m^2$ of surface treated. These amounts depend on the nature of the substrates and on the desired nonstick properties. They are usually between 0.5 and 1.5 $g/m^2$ in the case of nonporous substrates.

With regard to the amounts of adhesive coating, these are preferably less than 200 $g/m^2$ and more preferably less than 100 $g/m^2$.

The substrates may be a metal material, such as tinplate, and preferably a cellulosic material of the paper or board type for example, or a polymeric material of the vinyl type. Thermoplastic polymeric films, such as polyethylene, polypropylene or polyester films, are particularly advantageous.

In the embodiment in which the adhesive coating is in contact with a substrate consisting of a second material, this second material may be chosen from the materials proposed for the first substrate and may or may not be identical in nature to the first substrate. The adhesive coating may be applied in various ways. In particular it may be deposited by transfer.

Finally, the substrate to which the silicone coating and/or the adhesive coating are/is applied may already have been coated with an initial coating on which a coating according to the invention is superimposed, provided that this attached coating is transparent to electron-beam irradiation.

One other subject of the present invention is also the articles (for example sheets and tapes) comprising a complex according to the invention. These may especially be labels, self-adhesive sheets or adhesive tapes.

A second aspect of the present invention relates to the use of an additive as defined above, in a silicone coating according to the invention, intended to form a silicone/adhesive complex, as defined above, in order to vary the forces to release a silicone/adhesive interface by activating said additive by electron-beam irradiation.

More specifically, the subject of the present invention is the use of at least one organic (meth)acrylate derivative, an alkenyl ether and/or a silicone having one or more (meth)acrylate functional groups and/or one or more alkenyl ether functional groups, that can be activated by an electron-beam source, in a silicone-based composition according to the present invention, as an additive for regulating the adhesion of the corresponding silicone coating to a substrate, preferably an adhesive substrate as defined above.

Advantageously, the claimed use makes it possible to vary, depending on the irradiation applied, by means of an electron-beam source, the release force manifested by the silicone coating incorporating said additive, with respect to a substrate and preferably an adhesive coating according to the invention.

As regards more particularly the specific characteristics of said additive and of the silicone coatings or adhesives in terms of chemical composition, quantity, method of preparation and/or activation, reference should be made to the foregoing text.

The examples and figures which follow are given by way of illustration and imply no limitation of the present invention.

Equipment and Method

A silicone formulation consisting of the cationic UV system (SILCOLEASE POLY® and SILCOLEASE CATA211® oil sold by Rhodia Chimie) with two types of additives according to the invention was used. These were:

a silicone oil with acrylate functional groups: SILCOLEASE 21621® resin.

an acrylic organic monomer: trimethylpentanediol triacrylate (TMPTA).

These additives may represent up to 50% by weight of the coatiing.

EXAMPLE 1

The cationic UV fomulation tested was the following: SILCOLEASE CATA 211®/SILCOLEASE POLY 200®+SILCOLEASE 21621® resin.

The SILCOLEASE 21621® resin, which repersents the modulation additive, was added in a single amount: 10% in a formulation consisting of the above SILCOLEASE POLY 200®/SILCOLEASE CATA 211® mixture. The detailed formulation is given below.

|  | Formulation 1 | Formulation 2 |
| --- | --- | --- |
| SILCOLEASE POLY 200 ® | 90 | 90 |
| SILCOLEASE 21621 ® resin |  | 10 |
| SILCOLEASE CATA 211 ® | 2.5 | 2.5 |

At this content, the SILCOLEASE 21621® resin is completely miscible.

The formulations were coated at a rate of 50 m/min on an OPP CR50 film (polypropylene film) from UCB using a Rotomec pilot coater. The silicone coating was crosslinked by passing it beneath an 80 W/cm UV fusion lamp (H+ tube). The coatings deposited were around 1.2 $g/m^2$ in order to ensure good coverage of the substrate. The coating on the substrate and the curing of the mixtures posed no problems. No manifestation of an oily appearance, of prewetting or of stickiness to the touch was observed.

The coatings obtained were then adhesive-coated with the acrylic-type adhesive TESA® 4970. The complex was then subjected to irradiation from an EB source through the siliconized OPP film.

Six irradiation conditions were applied, the dose received by the specimen being expressed by kGray and depending on the speed at which it passes beneath the source and on the adjustment of the current.

Table 1 shows the various adjustment conditions for the electron beam (EB) generator and the doses received by the specimen. This irradiation took place through the substrate film and the silicone layer. The EB source was of the IRELEC® brand. Its acceleration voltage was between 200 and 400 keV and the filament current was between 0 to 10 mA. The specimen was transported beneath the electron beam at speeds of between 0.15 and 8 m/mn by means of a conveyer. By adjusting the acceleration voltage, the filament current and the conveying speed, it is possible to adjust the irradiation dose between a few kGrays and a hundred kGrays or so.

TABLE 1

| Conditions | Test 1 | Test 2 | Test 3 | Test 4 | Test 5 | Test 6 |
|---|---|---|---|---|---|---|
| Current in mA | 2.5 | 2.5 | 2.5 | 2.5 | 7.5 | 5 |
| Speed of pass beneath the beam in m/min | 8 | 1 | 0.7 | 0.56 | 1.5 | 1 |
| Irradiation energy in kilograys | 5 | 44 | 90 | 130 | 128 | 131 |

Within hours following the EB irradiation, the complex was separated by a 180° peel test at a rate of 300 mm/min as described in the FINAT3 standard. The peel forces obtained are given in Table 2 below. As a comparison, a formulation without an additive was also tested.

TABLE 2

| Silicone formulations | TESA 4970 ADHESION FORCE IN g/cm | | | | | | |
|---|---|---|---|---|---|---|---|
| | No irradiation | Test 1 | Test 2 | Test 3 | Test 4 | Test 5 | Test 6 |
| Formulation 1: POLY 200 ® + CATA 211 ® (control) | 8.4 | 16.3 | 23.7 | 28.3 | 50 | 38.9 | 48.8 |
| Formulation 2: POLY 200 ® + CATA 211 ® + 10% SILCOLEASE 21621 ® resin (trial 1) | 9.6 | 17.4 | 65 | 80.8 | 94.5 | 90.1 | 104.1 |

It may be seen that the irradiation causes an increase in the release force in the case of the formulation containing an additive. Forces of 80 g/cm were achieved for a dose of 90 kGray. Note there is a modulating effect with the formulation not containing an additive, but this effect is of a much smaller magnitude; it is obtained with greater irradiation doses.

EXAMPLE 2

The formulation tested was a SILCOLEASE CATA 211®/ SILCOLEASE POLY 200® formulation. The modulating additive used was TMPTA.

The TMPTA was added at two levels: 0.34 and 5%. The 0.34% mixture was miscible, whereas the 5% mixture was immiscible. The details of the formulations evaluated are given below.

| | Formulation 1: No additive | Formulation 3: 0.34% of TMPTA | Formulation 4: 5% of TMPTA |
|---|---|---|---|
| SILCOLEASE POLY 200 ® | 100 | 100 | 95 |
| TMPTA | | 0.34 | 5 |
| SILCOLEASE CATA 211 ® | 2.5 | 2.5 | 2.5 |

The processing conditions were the same as in the previous trial.

As previously, these coatings were adhesive-coated with the TESA 4970® adhesive and then the complex was irradiated under various conditions, which are those given in table 1 of example 1. The adhesion force of the TESA 4970® was then measured using a 180° peel test. The results obtained are given in table 3.

TABLE 3

| Silicone formulations | TESA 4970 ADHESION FORCE IN g/cm | | | | | | |
|---|---|---|---|---|---|---|---|
| | No irradiation | Test 1 | Test 2 | Test 3 | Test 4 | Test 5 | Test 6 |
| Formulation 1: POLY 200 ® + CATA 211 ® (control) | 8.4 | 16.3 | 23.7 | 28.3 | 50 | 38.9 | 48.8 |
| Formulation 4: POLY 200 ® + CATA 211 ® + 5% TMPTA (Trial 2) | 14.1 | 27.5 | 85.1 | 92.6 | 98.5 | 90.7 | 93.4 |
| Formulation 3: POLY 200 ® + CATA 211 + 0.34% TMPTA (Trial 3) | 16 | 19.7 | 36.7 | 57.2 | 87.9 | 59.2 | 68.1 |

It will be noted that there is an increase in the peel force with irradiation current for the systems containing additives. The modulating effect depends directly on the amount of TMPTA.

EXAMPLE 3

A standard thermally crosslinkable silicone formulation (vinyl-type oil/SiH-type crosslinking oil/platinum catalyst) was used. As modulating additive, SILCOLEASE 21621® resin was added to this formulation.

The tested formulation therefore comprised the SILCOLEASE 11365® resin (SiVi functionalized PMDS oil)/ the crosslinking agent SILCOLEASE 12031® (SiH functionalized PMDS oil) and the Karstedt platinum catalyst SILCOLEASE CATA 12070®. The exact composition was adjusted in order to have an SiH/SiVi ratio of 1.7 and the amount of Pt was about 100 ppm. 10% of the SILCOLEASE 21621® resin was added to this formulation. The details of the formulation were as follows:

| | Formulation 5: no additive | Formulation 6: with additive |
|---|---|---|
| SILCOLEASE 11365 ® resin | 100 | 90 |
| SILCOLEASE 21621 ® resin | | 10 |
| SILCOLEASE 12031 ® crosslinking agent | 2.5 | 2.2 |
| SILCOLEASE 12070 ® catalyst | 5 | 5 |

These formulations were coated at a rate of 50 m/min on an OPP CR50 film (polypropylene film) from UCB using a Rotomec pilot coater. The siliconized coating was crosslinked by passing it through a thermal oven heated to 150° C. The coatings deposited were around 1.2 g/m² in order to ensure good coverage of the substrate.

The coating and the crosslinking on the OPP substrate posed no problem: no manifestation of an oily appearance, of dewetting or of stickiness to the touch.

The coatings obtained were then adhesive-coated with the TESA 4970® adhesive. The complex was subjected to an irradiation from an EB source under the conditions given in table 1 of example 1. This irradiation was carried out through the support film and the silicone layer. Within hours following the EB irradiation, the complex was separated by a 180° peel test at a rate of 300 mm/min as described in the FINAT3 standard. The peel forces obtained are given in Table 3.

TABLE 3

TESA 4970 ADHESION FORCE IN g/cm

|   | No irradiation | Test 1 | Test 2 | Test 3 | Test 4 | Test 5 | Test 6 |
|---|---|---|---|---|---|---|---|
| Formulation 5 | 4.6 | 6.7 | 11.4 | 14.7 | 18.5 | 18.4 | 18.9 |
| Formulation 6 | 2.8 | 7.7 | 45.7 | 78.4 | 66.4 | 72.2 | 78.1 |

It will be noted in all cases that the level of adhesion of the PSA is increased after irradiation. This adhesion force depends on the energy delivered by the EB source.

EXAMPLE 4

A standard UV radical crosslinking formulation consisting of an acrylate oil and a radical photoinitiator was used.

The formulation consisted of the oil SILCOLEASE 21621 with, as catalyst, DAROCURE 1173® from Ciba Specialties. The details of the formulations are as follows:

|   | Formulation 7 |
|---|---|
| SILCOLEASE 21621 ® resin | 98 |
| DAROCURE 1173 ® | 2 |

The formulations were coated using a Meyer bar on an OPP CR50 film (polypropylene film) from UCB. The siliconized coating was crosslinked by passing it beneath a UV IST lamp with a power of 80 W/cm at a speed of 10 m/min. To ensure proper curing, the coating was in a nitrogen atmosphere.

The coatings deposited were around 1.2 g/m$^2$ in order to ensure good coverage of the substrate. The coating on the substrate and the curing of the compounds posed no problem: no manifestation of an oily appearance, of dewetting or of stickiness to the touch.

The coatings obtained were then adhesive-coated with the TESA 4970® adhesive. The complex was then subjected to irradiation from an EB source. The six irradiation conditions are described in table 1 of example 1. The irradiation was carried out through the support film and the silicone layer.

Within hours following the EB irradiation, the complex was separated by a 180° peel test at a rate of 300 mm/min as described in the FINAT3 standard. The peel forces obtained are given in the table below.

TABLE 5

TESA 4970 ADHESION FORCE IN g/cm

|   | No irradiation | Test 1 | Test 2 | Test 3 | Test 4 | Test 5 | Test 6 |
|---|---|---|---|---|---|---|---|
| Formulation 7: SILCOLEASE 21621 ® resin + DAROCURE 1173 ® | 9.6 | 30 | 80 | 100 | 120 | 120 | 140 |

What is claimed is:

1. A silicone/adhesive complex comprising at least one silicone coating applied to a first substrate and an adhesive coating applied to a second substrate, the force to release a silicone/adhesive interface of which can be varied, wherein said silicone coating comprises at least one additive for regulating the force to release a silicone/adhesive interface and the activity of which is initiated and able to be varied by electron-beam irradiation.

2. The complex as claimed in claim 1, wherein the two substrates comprise two separate entities placed so that the silicone coating of the first substrate is in contact with the adhesive coating of the second substrate.

3. The complex as claimed in claim 1, wherein the two substrates each comprise respectively of the two faces of the same entity.

4. The complex as claimed in claim 1, wherein the activity of the additive for regulating the release force is initiated and can be varied by exposing at least the silicone/adhesive interface to at least one electron-beam irradiation.

5. The complex as claimed in claim 1, wherein the additive for regulating the force to release the silicone/adhesive interface adopted within the context of the present invention is selected from the group consisting of:
(i) organic (meth)acrylate derivatives;
(ii) alkenyl ethers; and
(iii) silicones having one or more (meth)acrylate and/or alkenyl ether functional groups.

6. The complex as claimed in claim 1, wherein the additive for regulating the release force is a silicone having one or more (meth)acrylate and/or alkenyl ether functional groups.

7. The complex as claimed in claim 6, wherein the silicones with(meth)acrylate functional groups are selected from the group consisting of organopolysioxanes having acrylate, metbacrylate, (meth)acrylate ether and meth (acrylate)ester functional groups linked to the polysiloxane chain via a SiC bond.

8. The complex as claimed in claim 6, wherein the silicones with alkenyl ether functional groups are derived from a hydrosilylation reaction between oils containing Sill structural units and compounds carrying alkenyl ether functional groups.

9. The complex as claimed in claim 1, wherein the additive for regulating the release force is employed in an amount from 0.1 to 20% by weight of the total silicone mixture.

10. The complex as claimed in claim 1, wherein the silicone coating derives from the polymerization and/or crosslinking of polyorganosioxane monomers, oligomers and/or polymers.

11. The complex as claimed in claim 10, wherein the polymerization and/or crosslinking derives from hydrosilylation between, on the one hand, monomers, oligomers and/or polymers carrying reactive SiH structural units and, on the other hand, monomers, oligomers and/or polymers carrying an unsaturated aliphatic reactive group.

12. A silicone/adhesive complex comprising at least one silicone coating applied to a first substrate and an adhesive coating applied to a second substrate, the force to release a silicone/adhesive interface of which can be varied, wherein said silicone coating comprises at least one additive for regulating the force to release a silicone/adhesive interface and the activity of which is initiated and able to be varied by electron-beam irradiation, wherein the silicone coating derives from the polymerization and/or crosslinking of polyorganosiloxane monomers, oligomers and/or polymers, wherein the polymerization and/or crosslinking derives from hydrosilylation between, on the one hand, monomers, oligomers and/or polymers carrying reactive SiH structural units and, on the other hand, monomers, oligomers and/or polymers carrying an unsaturated aliphatic reactive group, and wherein the polyorganosiloxane having at least one reactive SiH radical per molecule is a polyorganohydrogenosiloxane A comprising:

units of formula (1)

$$H_aW_bSiO_{\frac{4-(a+b)}{2}} \quad (1)$$

in which:
the symbols W, which are similar and/or different, represent:
a linear or branched alkyl radical containing 1 to 18 carbon atoms, optionally substituted with at least one halogen,
a cycloalkyl radical containing between 5 and 8 cyclic carbon atoms, optionally substituted with at least one halogen,
an aryl radical containing between 6 and 12 carbon atoms which may optionally be substituted on the aryl part with halogens, alkyls and/or alkoxyls containing 1 to 3 carbon atoms, or
an arylailcyl part having an alkyl part containing between 5 and 14 carbon atoms and an aryl part containing between 6 and 12 carbon atoms, optionally substituted on the aryl part by halogens, alkyls and/or alkoxyls containing 1 to 3 carbon atoms,
a is 1 or 2, b is 0, 1 or 2, with the sum (a+b) having a value of between 1 and 3; and
optionally, other units of average formula (2):

$$WcSiO_{\frac{4-c}{2}} \quad (2)$$

in which W has the same meaning as above and c has a value of between 0 and 3.

13. The complex as claimed in claim 12, wherein the polyorganosiloxane a A is selected from the group consisting of: dimethylpolysiloxanes having hydrogenodimethylsilyl end groups; dimethylhydrogenomethylpolysioxane copolymers having trimethylsilyl end groups; dimethylhydrogenomethylpolysioxane copolymers having hydrogenodimethylsilyl end groups; hydrogenomethylpolysiloxanes having trimethylsilyl end groups; and cyclic hydrogenomethylpolysiloxanes.

14. A silicone/adhesive complex comprising at least one silicone coating applied to a first substrate and an adhesive coating applied to a second substrate, the force to release a silicone/adhesive interface of which can be varied, wherein said silicone coating comprises at least one additive for regulating the force to release a silicone/adhesive interface and the activity of which is initiated and able to be varied by electron-beam irradiation, wherein the silicone coating derives from the polymerization and/or crosslinking of polyorganosiloxane monomers, oligomers and/or polymers, wherein the polymerization and/or crosslinking derives from hydrosilylation between, on the one hand, monomers, oligomers and/or polymers carrying reactive SiH structural units and, on the other hand, monomers, oligomers and/or polymers carrying an unsaturated aliphatic reactive group and, wherein the polyorganosiloxane having at least one unsaturated aliphatic reactive group per molecule is a polyorganosiloxane B comprising similar or different units of formula (3):

$$W'_dY_eSiO_{\frac{4-(d+e)}{2}} \quad (3)$$

in which:
the symbols W', which are similar and/or different, represent:

a linear or branched alkyl radical containing 1 to 18 carbon atoms, optionally substituted with at least one halogen,
a cycloalkyl radical containing between 5 and 8 cyclic carbon atoms, optionally substituted with at least one halogen,
an aryl radical containing between 6 and 12 carbon atoms which may optionally be substituted on the aryl part with halogens, alkyls and/or alkoxyls containing 1 to 3 carbon atoms,
an arylalkyl part having an alkyl part containing between 5 and 14 carbon atoms and an aryl part containing between 6 and 12 carbon atoms, optionally substituted on the aryl part with halogens, or alkyls and/or alkoxyls containing 1 to 3 carbon atoms,
the symbols Y are similar or different and represent a $C_1$–$C_{12}$ linear or branched alkenyl residue having at least one ethylenically unsaturated group at the chain end and/or in the chain, and optionally at least one heteroatom;
e is equal to 1 or 2, d is equal to 0, 1 or 2 with the sum (d+e) having a value of between 1 and 3;
and, optionally, other units of average formula (2):

$$WcSiO_{\frac{4-c}{2}} \quad (2)$$

in which W satisfies the definition proposed for W' and c has a value of between 0 and 3.

15. The complex as claimed in claim 11, wherein the silicone coating comprises compounds A and compounds B in an amount such that the SiH/unsaturated group molar ratio is between 0.4 and 10.

16. The complex as claimed in claim 11, wherein the silicone coating further comprises a catalyst of the heat-sensitive platinum complex type.

17. The complex as claimed in claim 11, wherein the silicone coating further comprises an inhibitor for the reaction.

18. The complex as claimed in claim 1, wherein the silicone coating derives from dehydrogenocondensation between, on the one hand, a polyorganosioxane derivative A having at least one reactive SiH radical per molecule and, on the other hand, a polyorganosiloxane having at least one reactive SiOH radical per molecule.

19. The complex as claimed in claim 18, wherein the polyorganosiloxane possessing at least one reactive SiH radical per molecule is a polyorganosiloxane A.

20. A complex comprising at least one silicone coating applied to a first substrate and an adhesive coating applied to a second substrate, the force to release a silicone/adhesive interface of which can be varied, wherein said silicone coating comprises at least one additive for regulating the force to release a silicone/adhesive interface and the activity of which is initiated and able to be varied by electron-beam irradiation, wherein the silicone coating derives from dehydrogenocondensation between, on the one hand, a polyorganosiloxane derivative A having at least one reactive SiH radical per molecule and, on the other hand, a polyorganosioxane having at least one reactive SiOH radical per molecule, and wherein the polyorganosioxane derivatives (C) are selected from the group consisting of polyorganosioxanes comprising:

units of the following formula (4):

in which:
the symbols W″, which are similar or different, represent:
a linear or branched alkyl radical containing 1 to 18 carbon atoms, optionally substituted with at least one halogen,
a cycloalkyl radical containing between 5 and 8 cyclic carbon atoms, optionally substituted with at least one halogen,
an aryl radical containing between 6 and 12 carbon atoms which may optionally be substituted on the aryl part with halogens, alkyls and/or alkoxyls containing 1 to 3 carbon atoms, or
an arylalkyl part having an alkyl part containing between 5 and 14 carbon atoms and an aryl part containing between 6 and 12 carbon atoms, optionally substituted on the aryl part with halogens, alkyls and/or alkoxyls containing 1 to 3 carbon atoms,
f is 1 or 2, g is 0, 1 or 2, with the sum (f+g) having a value of between 1 and 3;
and, optionally, other units of formula (2):

in which W satisfies the definition proposed for W″ and c has a value of between 0 and 3.

21. The complex as claimed in claim 18, wherein the polyorganosiloxanes A used comprise from 1 to 50 SiH units per molecule and the polyorganosiloxanes C used comprise from 1 to 50 SiOH units per molecule.

22. The complex as claimed in claim 1, wherein the silicone coating derives from the polymerization and/or crosslinking by UV irradiation, thermal activation or by an electron beam of polyorganosiloxane monomers, oligomers or polymers carrying reactive units of the acrylate, epoxy, oxetane, dioxolane and/or alkenyl ether type.

23. A complex comprising at least one silicone coating applied to a first substrate and an adhesive coating applied to a second substrate, the force to release a silicone/adhesive interface of which can be varied, wherein said silicone coating comprises at least one additive for regulating the force to release a silicone/adhesive interface and the activity of which is initiated and able to be varied by electron-beam irradiation, wherein the silicone coating derives from the polymerization and/or crosslinking by UV irradiation, thermal activation or by an electron beam of polyorganosioxane monomers, oligomers or polymers carrying reactive units of the acrylate, epoxy, oxetane, dioxolane and/or alkenyl ether type, and wherein the polyorganohydrogenosiloxanes comprise:
units of formula (5):

in which:
the symbols W‴, which are similar and/or different, represent:
a linear or branched alkyl radical containing 1 to 18 carbon atoms, optionally substituted with at least one halogen,
a cycloalkyl radical containing between 5 and 8 cyclic carbon atoms, optionally substituted with at least one halogen,
an aryl radical containing between 6 and 12 carbon atoms which may optionally be substituted on the aryl part with halogens, alkyls and/or alkoxyls containing 1 to 3 carbon atoms, or
an arylalkyl part having an alkyl part containing between 5 and 14 carbon atoms and an aryl part containing between 6 and 12 carbon atoms, optionally substituted on the aryl part with halogens, alkyls and/or alkoxyls containing 1 to 3 carbon atoms,
the symbols Z are similar or different and represent:
a group W‴,
a hydrogen radical, and/or
a crosslinkable organofunctional group, linked to the silicon of the polyorganosiloxane via a divalent radical containing from 2 to 20 carbon atoms and optionally containing at least one heteroatom,
with at least one of the symbols Z representing a crosslinkable functional organic group;
h is equal to 1 or 2, i is equal to 0, 1 or 2 with the sum (h+i) having a value of between 1 and 3;
optionally, other units of formula (2):

in which W satisfies the definition proposed for W‴ and c has a value of between 0 and 3.

24. The complex as claimed in claim 22, wherein the polyorganosiloxanes used contain from 3 to 10 organofunctional groups per macromolecular chain.

25. A complex comprising at least one silicone coating applied to a first substrate and an adhesive coating applied to a second substrate, the force to release a silicone/adhesive interface of which can be varied, wherein said silicone coating comprises at least one additive for regulating the force to release a silicone/adhesive interface and the activity of which is initiated and able to be varied by electron-beam irradiation, wherein the silicone coating derives from the polymerization and/or cross linking by UV irradiation, thermal activation or by an electron beam of polyorganosiloxane monomers, oligomers or polymers carrying reactive units of the acrylate, epoxy, oxetane, dioxolane and/or alkenyl ether type, and wherein the organofunctional groups are selected from the groups consisting of:

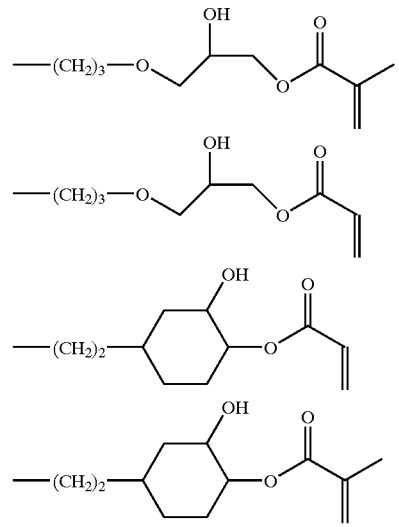

-continued

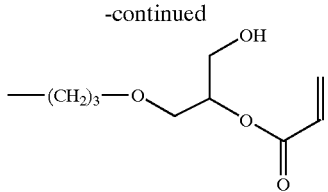

and their isomers

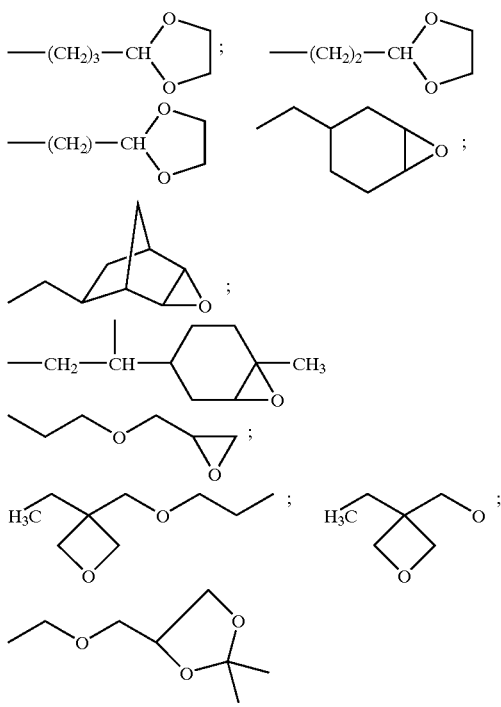

$(O)_{n'}-(CH_2)_n-O-CH=CH_2$ $(O)_{n'}-(CH_2)_n-R^1-O-CH=CH_2$ $(O)_{n'}-(CH_2)_n-O-CH=CH-R^2$ in which:

n' represents 0 or 1 and n" an integer between 1 and 5;
$R^1$ represents:
 a $C_1-C_{12}$ linear, branched or cyclic alkylene radical, optionally substituted, or
 a $C_5-C_{12}$ arylene radical, optionally substituted, with one to three $C_1-C_6$ alkyl groups;
$R^2$ represents a $C_1-C_6$ linear or branched alkyl radical.

26. The complex as claimed in claim 1, wherein the adhesive coating derives from a pressure-sensitive adhesive emulsion.

27. The complex as claimed in claim 26, wherein the pressure-sensitive adhesive emulsions are obtained by polymerization of monomers having a glass transition temperature of between −70° C. and −10° C.

28. The complex as claimed in claim 27, wherein the monomers are selected from the group consisting of:
 (meth)acrylic esters;
 vinyl nitriles;
 vinyl esters of carboxylic acid;
 ethylenically unsaturated monocarboxylic and dicarboxylic acids;
 amides of unsaturated carboxylic acids;
 ethylenic monomers containing a sulfonic acid group and its ammonium or alkali metal salts;
 unsaturated ethylenic monomers containing a secondary, tertiary or quaternary amino group, or a heterocyclic group containing nitrogen;
 zwitterionic monomers;
 ethylenic monomers carrying a sulfate group;
 ethylenic monomers carrying one or more phosphate and/or phosphonate functional groups; and
 mixtures thereof.

29. An article comprising the complex as claimed in claim 1.

30. The article as claimed in claim 29, which is a label, a self-adhesive sheet or an adhesive tape.

31. A method to form a silicone/adhesive complex in order to vary the force to release a silicone/adhesive interface by electron-beam irradiation of said additive comprising using the complex as claimed in claim 1.

32. The complex of claim 1, wherein the concentration of the regulation additive is between about 0.1% and about 20% by weight of the total silicone mixture.

* * * * *